July 2, 1963 G. F. VOGT 3,096,492

CARRIER-SUPPRESSED MODULATOR

Filed Oct. 28, 1960

INVENTOR.
GOTTFRIED F. VOGT

BY Jack H. Linscott

ATTORNEY.

United States Patent Office 3,096,492

Patented July 2, 1963

3,096,492

CARRIER-SUPPRESSED MODULATOR

Gottfried F. Vogt, Lincroft, N.J., assignor to the United States of America as represented by the Secretary of the Army Filed Oct. 28, 1960, Ser. No. 65,870
12 Claims. (Cl. 332—43)
(Granted under Title 35, U.S. Code (1952), sec. 266)

The invention described herein may be manufactured and used by or for the Government for governmental purposes, without the payment of any royalty thereon.

This invention relates to non-linear translating circuits and more particularly to modulating circuits incorporating semi-conductor devices of opposite conductivity or complementary symmetry.

Suppressed carrier modulation systems utilizing vacuum tubes are well known. Such modulation systems are usually provided with a pair of electron discharge devices in a symmetrical or balanced circuit arrangement. While transistors may be adapted to symmetrical modulation circuits, such circuits have heretofore usually required fixed D.-C. biases for proper operation. Transistors, as distinguished from vacuum tubes, may be of opposite conductivity types or complementary symmetry types as disclosed, for example, in an article by George C. Sziklai in the June 1953 Proceedings of the IRE (pages 717–724). This characteristic of transistors is utilized in accordance with the present invention in a signal modulation circuit.

It is an object of the present invention to provide a modulator circuit utilizing a pair of semi-conductor devices of the opposite conductivity type.

It is another object of the present invention to provide an improved modulator circuit utilizing a pair of semi-conductor devices of the opposite conductivity type and wherein no potential bias supply is necessary.

It is still another object of the present invention to provide an improved modulator circuit utilizing a pair of semi-conductor devices of the opposite conductivity type and wherein high linearity of the output envelope is achieved.

It is still another object of the present invention to provide a modulating circuit wherein the modulating signal and the carrier signal are simultaneously suppressed.

In accordance with the present invention there is provided a modulator circuit which includes a pair of semi-conductor devices of opposite conductivity type each having emitter, collector and base electrodes, with the emitter electrodes being connected in common. Included further are a source of carrier voltage signal, a source of modulating voltage signal, and means in circuit with the collector electrodes for impressing the carrier voltage signal in phase opposition therebetween. Also included are means for applying the modulating voltage signal in phase to the base electrodes and means for deriving an output signal from the common connected emitter electrodes.

For a better understanding of the invention together with further objects thereof, reference is had to the following description taken in connection with the accompanying drawings in which.

Figure 1:
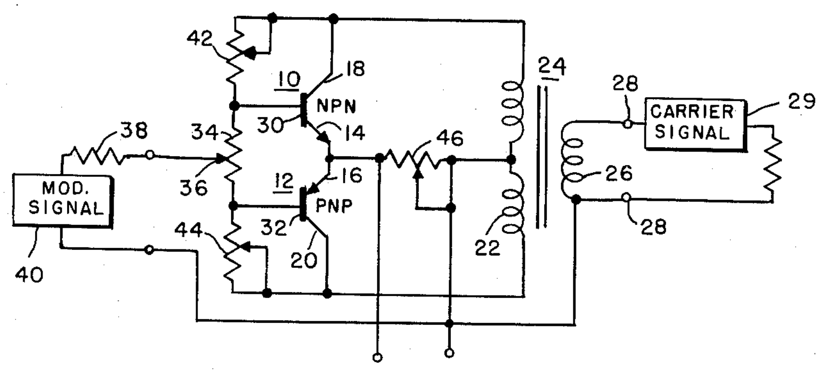
FIG. 1 is a schematic circuit diagram of the modulator in accordance with the present invention.

Referring now to FIG. 1 of the drawing, there is shown at 10 and 12 a pair of junction transistors of opposite conductivity type, herein shown as NPN and PNP types, respectively. Each transistor includes a base electrode, an emitter electrode and a collector electrode. The emitter electrodes 14 and 16 are connected in common and the collector electrodes 18 and 20 are connected by a center-tapped secondary winding 22 of input transformer 24. As shown, the primary winding 26 of transformer 24 is provided with a pair of input terminals 28 to which the carrier wave signal energy source 29 may be applied. The base electrodes 30 and 32 are connected across the end terminals of a potentiometer 34, the sliding contact member 36 thereof being connected through resistor 38 to the output of the modulating signal input source 40. Collector 18 of transistor 10 is connected to its associated base electrode 30 through variable resistor 42 and, similarly, collector 20 of transistor 12 is connected to its associated base electrode 32 through variable resistor 44. An output variable load resistor 46 is connected between the center-tap of secondary winding 22 and the common connection of emitters 14 and 16. As shown, the signal modulating input signal, the carrier signal, and the output signal across resistor 46 are referenced with respect to the center tap of secondary winding 22. With the arrangement as hereinabove described, the input voltage from source 40 is single-ended and is fed in phase to the respective base electrodes of NPN transistor 10 and PNP transistor 12 through resistor 38 and through the sliding contact of potentiometer 34. The carrier voltage is fed in push-pull to the respective collectors of NPN transistor 10 and PNP transistor 12 through the primary and secondary of transformer 24. The adjustment of slider 36 of potentiometer 34 provides for the balance of the carrier signal while the adjustment of variable load resistor 46 provides for the balance of the input signal from source 40. The variable resistors 42 and 44 respectively connected between collector and base of transistors 10 and 12 provide fine correction or balance of any remaining unsymmetry of the desired envelope.

Figure 2:
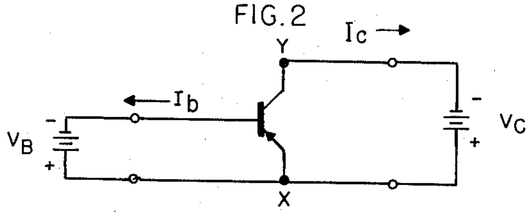
FIGS. 2 and 3 are representative diagrams to illustrate normal and inverted mode transistor operation.
Figure 3:
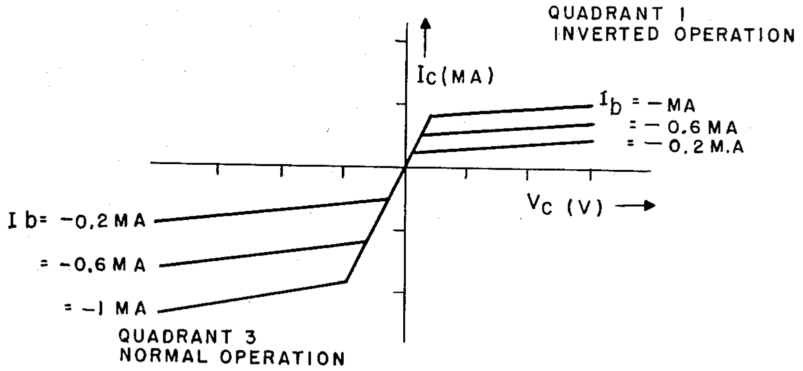

Complementary transistors 10 and 12 operate in both the normal and inverted mode of operation. The term "normal mode" of operation refers to the standard transistor operation wherein, for a PNP transistor, the circuit functions as a common emitter configuration. Such a representative circuit is shown in FIG. 2 wherein the X terminal is the emitter and the Y terminal is the collector. For this type of configuration, the collector current is negative for negative base and collector voltages as shown in quadrant 3 of the static characteristic curve for a PNP transistor (FIG. 3). If the normal collector bias is now reversed, the Y terminal becomes the emitter; the X terminal becomes the collector and the collector current flows in the opposite direction, quadrant 1 of FIG. 3, through the load. The PNP transistor circuit may now be said to operate in the inverted mode and thereby becomes a common collector configuration due to the fact that the collector bias diode is now forward biased (low resistance) and the emitter-base diode is now reverse biased (high resistance direction). For the NPN transistor, of course, the normal or standard operation comprises a common collector configuration and in inverted operation the NPN transistor comprises a common emitter configuration. The slider 36 of potentiometer 34 proportions the values of the respective resistances which are present between each transistor's base and ground. Thus the potentiometer 34 allows the balance of complementary transistors with unequal betas (B) inverted, since in inverted operation each transistor works as a common emitter configuration.

With the above explanation in mind, the operation of the circuit as a balanced modulator will now be described. The carrier signal is applied to the respective collector electrodes 18 and 20 of transistors 10 and 12 in push-pull so that for the positive half-cycle of the carrier signal both transistors 10 and 12 operate in the normal mode. Thus both transistors operate as a common collector circuit with a voltage gain near unity. The positioning of the center arm of potentiometer 34 has little effect on the output envelope since a common collector configuration has a high input resistance and resistance changes in either branch of potentiometer 34 has little effect on the modulator's operation. Since the voltage gain of the common collector's configuration is not very much affected by changes in resistance of both parts of potentiometer 34, a separate adjustment of the normal mode is provided in the form of variable resistors 42 and 44. By such an arrangement, a part of the carrier current of each transistor is fed back to their respective bases thereby pre-biasing the base-emitter diode. The voltage gain of each transistor in the normal or common collector operation can be lowered by reducing its respective feedback resistor. Each feedback resistor 42 and 44, of course, are in series arrangement with a portion of potentiometer 34 to provide a voltage divider network for the single-ended input signal applied to respective bases 30 and 32 of transistors 10 and 12. During the negative half cycle of the carrier signal, the transistors 10 and 12 operate in the inverted mode so that each transistor works as a common emitter configuration. The input signal from source 40 controls the current in each of the transistors. The difference of the output currents in the NPN and PNP branch for every instant of the carrier voltage applied at the same time to the two transistors 10 and 12 generates a voltage across load resistor 46. The peak amplitude of this voltage will change proportionately to the input voltage. The polarity of the voltage across load resistor 46 depends upon the polarity of the instantaneous amplitude of the input signal and the carrier signal.

Figure 4:
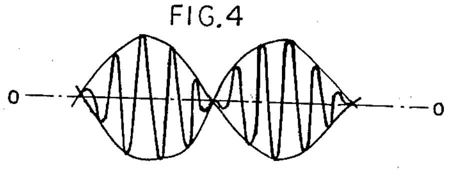
FIG. 4 shows the output waveform of the modulator.

By making the voltage gain of the modulator equal in the normal and inverted mode of operation of the transistors, the input signal is balanced out in the output of the modulator, i.e., the input signal is suppressed. This can be achieved by the proper selection of the value of load resistor 46. Since the transistors work in common collector configuration during the normal mode and in common emitter configuration during the inverted mode, the load resistor 46 has a different effect on the output voltage gain for each mode of operation. The value of the load resistor 46 is so chosen that, with a single value, the voltage gain for the normal and inverted mode of operation will be equalized. Each mode corresponding to the positive or negative half-cycle of the carrier are generated separately during different time intervals and then superimposed on the common load resistor 46. The resulting modulated wave envelope is shown in FIG. 4.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A modulator circuit comprising a pair of semi-conductor devices of opposite conductivity type each having emitter, collector and base electrodes, said emitter electrodes being directly connected in common, a source of carrier voltage signal, a source of modulating voltage signal, means directly connected across said collectors for impressing said carrier voltage signal in phase opposition therebetween, means for applying said modulating voltage signal in phase to said base electrodes, and means for deriving an output signal from said common connected emitter electrodes.

2. A modulating circuit comprising a pair of semi-conductor devices of opposite conductivity type each having emitter, collector and base electrodes, said emitter electrodes being directly connected in common, a source of carrier voltage signal, a source of modulating voltage signal, means including an inductor serially and directly connected across said collector electrodes and coupled to said carrier voltage signal to provide a first input signal in phase opposition between said collector electrodes, means for applying said modulating voltage signal in phase to said base electrodes, and means in circuit with said common connected emitters and said inductor for deriving an output signal from said common connected emitter electrodes.

3. A modulating circuit comprising a pair of semi-conductor devices of opposite conductivity type each having emitter, collector and base electrodes, said emitter electrodes being directly connected in common, a source of carrier voltage signal, a source of modulating voltage signal, means comprising an inductor serially and directly connected across said collector electrodes and coupled to said carrier voltage signal to provide a signal in phase opposition between said collector electrodes, said inductor being provided with a center-tap, means for applying said modulating voltage signal between said center-tap and each of said base electrodes, and means connected between said center-tap and said common connected emitters for deriving an output signal.

4. The modulating circuit in accordance with claim 3 wherein said last mentioned means comprises a load resistor having a value such that the gain of each of said semi-conductor devices for normal and inverted mode of operation are made equal.

5. A modulating circuit comprising a pair of semi-conductor devices of opposite conductivity type each having emitter, collector and base electrodes, said emitter electrodes being directly connected in common, a source of carrier voltage signal, a source of modulating voltage signal, means comprising an inductor serially and directly connected across said collector electrodes and coupled to said carrier voltage signal to provide a signal in phase opposition between said collector electrodes, said inductor being provided with a center-tap, a potentiometer including a slider contact arm connected between said base electrodes, said modulating voltage signal being applied between said center-tap and said potentiometer slider contact arm, a load resistor interconnecting said center-tap and said common emitter connection, the output of said load resistor being referenced with respect to said center-tap, and respective variable feedback resistors connected between the collector and base of the respective semi-conductor devices.

6. A modulator circuit comprising a pair of semi-conductor devices of opposite conductivity type each having emitter, collector and base electrodes, said emitter electrodes being directly connected in common, an input circuit including an inductor serially and directly connected across said collector electrodes to provide a first input signal in phase opposition therebetween and including a center-tap, a second input circuit connected between said center-tap and each of said base electrodes for providing a second input signal of the same phase therebetween, and an output circuit connected between said center-tap and said common connected emitter whereby an output signal is derived at said common emitter connection.

7. The modulating circuit in accordance with claim 6 wherein said output circuit comprises a load resistor having a value such that the gain of each of said semi-conductor devices for normal and inverted mode of operation are made equal.

8. A modulator circuit comprising a pair of semi-conductor devices of opposite conductivity type each having emitter, collector and base electrodes, said emitter electrodes being directly connected in common, an input circuit including an inductor serially and directly connected across said collector electrodes to provide a first input signal in phase opposition therebetween and including a center-tap, a potentiometer including a slider contact connected between said base electrodes, a second input circuit connected between said center-tap and said potentiometer slider contact for providing a second input signal of the same phase between said base electrodes, and an output circuit connected between said center-tap and said common emitter connection whereby an output signal is derived at said common emitter connection.

9. The modulator in accordance with claim 8 and further including respective variable feedback resistors connected between the collector and base of the respective semi-conductor devices.

10. A modulator circuit comprising a pair of semiconductor devices of opposite conductivity type each having emitter, collector and base electrodes, said emitter electrodes being directly connected in common, an input circuit including an inductor serially and directly connected across said collector electrodes to provide a first input signal in phase opposition therebetween and including a center-tap, a potentiometer including a slider contact arm connected between said base electrodes, a second input circuit connected between said center-tap and said potentiometer slider contact for providing a second input signal of the same phase between said base electrodes, and a load resistor interconnecting said center-tap and said common emitter connection, the output of said load resistor being referenced with respect to said center-tap.

11. The modulating circuit in accordance with claim 10 and further including respective variable feedback resistors connected between the collector and base of the respective semi-conductor devices.

12. The modulating circuit in accordance with claim 10 wherein the value of said load resistor is chosen such that the voltage gain of each of said semi-conductor devices for normal and inverted mode of operation are made equal.

References Cited in the file of this patent

UNITED STATES PATENTS

| | | |
|---|---|---|
| 2,788,493 | Zawels | Apr. 9, 1957 |
| 2,827,611 | Beck | Mar. 18, 1958 |
| 2,907,932 | Patchell | Oct. 6, 1959 |
| 2,941,093 | Merel | June 14, 1960 |
| 2,943,271 | Willis | June 28, 1960 |